Sept. 28, 1943.  K. W. HARPER ET AL  2,330,709
PROJECTOR
Filed May 24, 1940  2 Sheets-Sheet 1

INVENTORS
WILLIAM F. PECK
KENNARD W. HARPER
ALBIN A GRADISAR
WILLIAM K. ARMAGOST
BY
Raymond A. Paquin
ATTORNEY

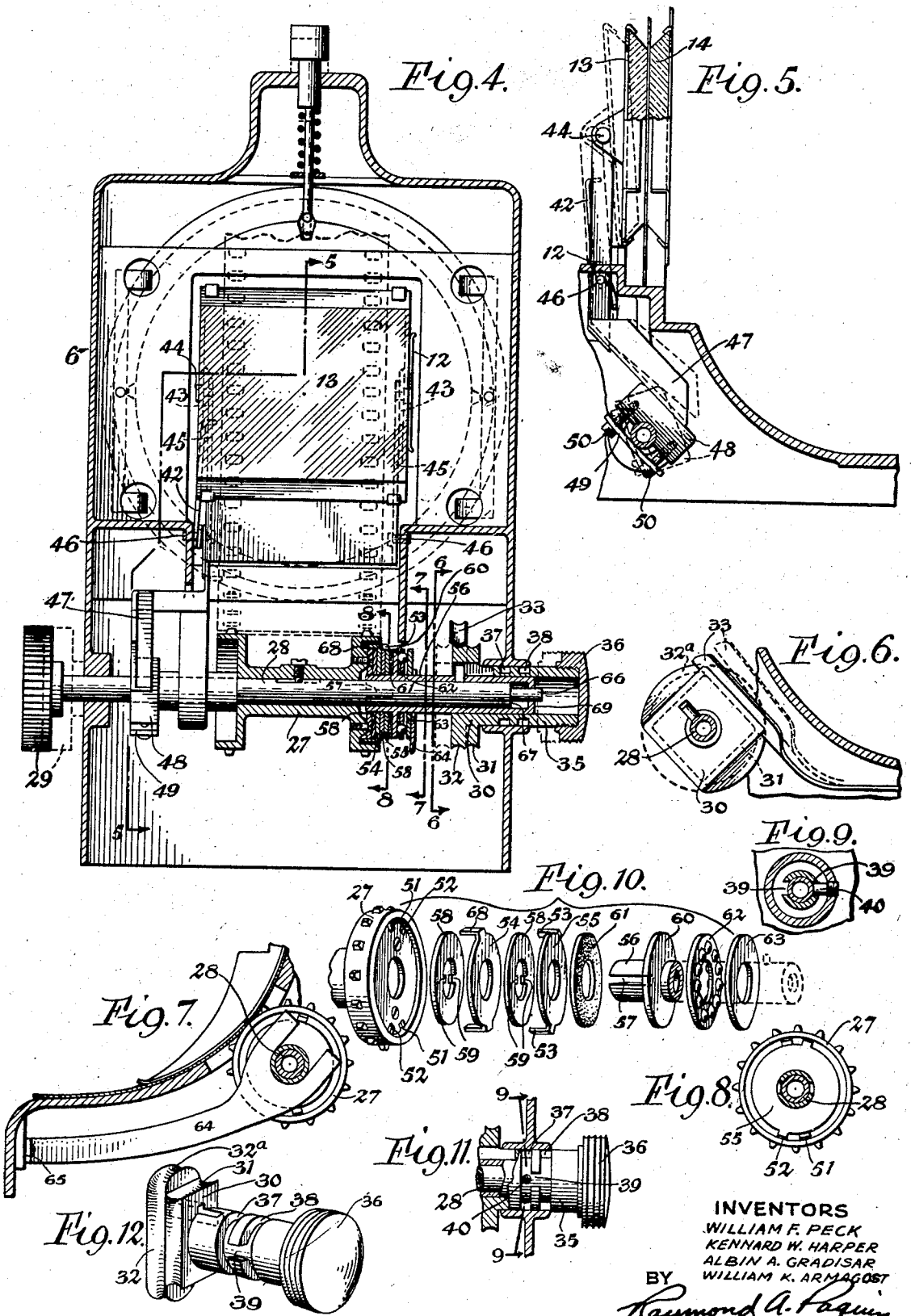

Patented Sept. 28, 1943

2,330,709

UNITED STATES PATENT OFFICE 2,330,709

PROJECTOR

Kennard W. Harper, Albin A. Gradisar, and William K. Armagost, Buffalo, and William F. Peck, Snyder, N. Y., assignors to Spencer Lens Company, Buffalo, N. Y., a corporation of New York Application May 24, 1940, Serial No. 337,000

6 Claims. (Cl. 88—28)

This invention relates to projectors and has particular reference to projectors adapted for use with both film slides and glass slides.

One of the principal objects of the invention is to provide a new and improved projector which may be used with glass slides or with film slides of single or double frame.

Another object of the invention is to provide such a device which may easily and quickly be adapted for use with either single or double frame film slides.

Another object of the invention is to provide a projector for film slides having means for opening the film gate before movement of the film to prevent damage to the film.

Another object of the invention is to provide new and improved clutch means for a projector of the type described.

Another object of the invention is to provide a new and improved projector wherein the head may be rotated to allow projection at various angular positions and wherein the projector head may be locked in any of said adjusted positions.

Another object of the invention is to provide new and improved pressure plate release and operating mechanism.

Other objects and advantages of the invention will be apparent from the following description taken in connection with the accompanying drawings. It will be understood that many changes may be made in the details of construction and arrangement of parts without departing from the scope of the invention as expressed in the accompanying claims. We, therefore, do not wish to be limited to the details shown and described as the preferred form has been shown by way of illustration only.

Referring to the drawings:

Fig. 4 is a sectional view taken on line 4—4 of Fig. 3, looking in the direction of the arrows;

Fig. 5 is a sectional view taken on line 5—5 of Fig. 4, looking in the direction of the arrows;

Fig. 6 is a sectional view taken on line 6—6 of Fig. 4, looking in the direction of the arrows;

Fig. 7 is a sectional view taken on line 7—7 of Fig. 4, looking in the direction of the arrows;

Fig. 8 is a sectional view taken on line 8—8 of Fig. 4, looking in the direction of the arrows;

Fig. 9 is a section on line 9—9 of Fig. 11, looking in the direction of the arrows;

Fig. 10 is a perspective view showing the clutch parts unassembled;

Fig. 11 is a view, partly in section, showing the double and single frame operating mechanism; and Fig. 12 is a perspective view of the single and double frame indexing device.

Figure 1:
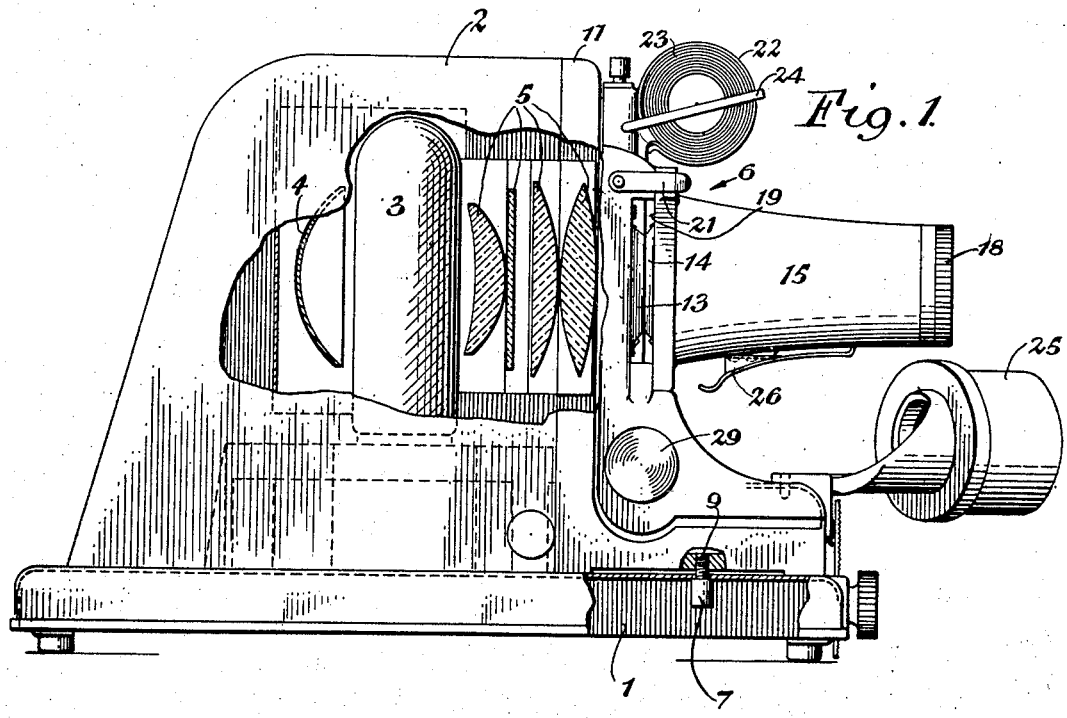
Fig. 1 is a side view, partly in section, of a projector embodying the invention.
Figure 2:
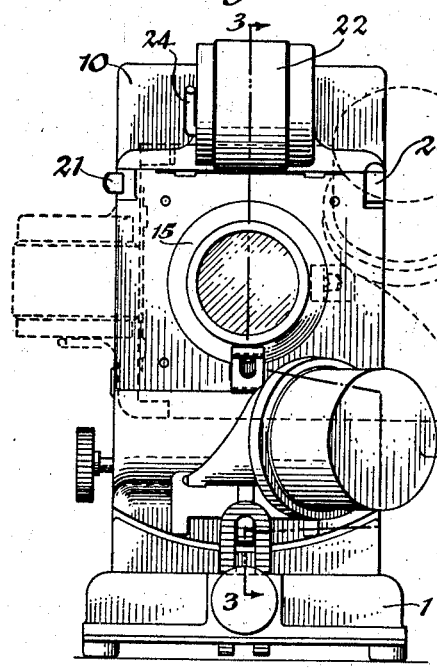
Fig. 2 is a front elevation of the projector shown in Fig. 1.
Figure 3:
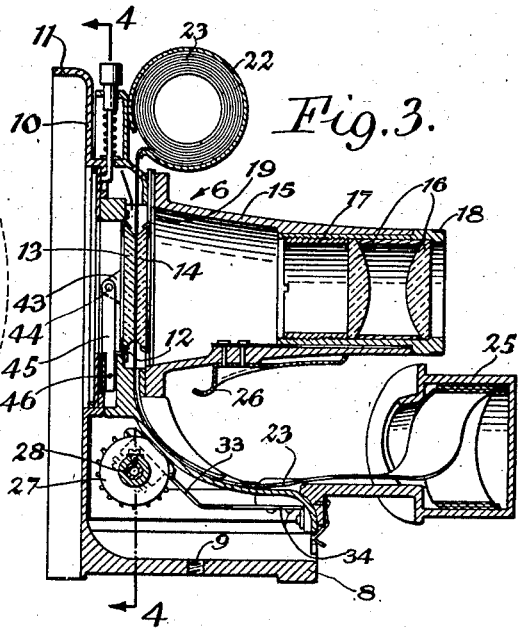
Fig. 3 is a sectional view taken on line 3—3 of Fig. 2.

Referring more particularly to the drawings wherein similar reference characters designate corresponding parts throughout the several views, the projector embodying the invention comprises the base 1 to which is secured the lamp housing member 2 containing the lamp 3, reflector 4, and lens system 5.

On the forward end of the base 1 is secured the front 6, which front may be easily and quickly attached or detached from said base 1 as its only point of connection therewith is the set screw 7.

The front 6 comprises the supporting portion adapted to seat on the base 1 and having the threaded opening 8 adapted to receive the threaded portion of the screw 7 to retain the front 6 in operative position on the base 1.

Preferably formed integral with said supporting portion 9 is the upright support 10 which has the flange 11 adapted to engage the forward end of the lamp housing 2 when the parts are assembled on the base 1. The upright portion 10 has an opening 12 adapted to be in alignment with the lens system 5 in the lamp house 2 and positioned in said opening 12 are the glass plates 13 and 14 adapted to form the film gate. Also aligned with said lens system 5, opening 12 and film gate plates 13 and 14 is the focussing tube 15 carrying the objective or focussing lenses 16 in the ring 17 and adapted to be adjusted to focus the projected image on the screen by means of the knurled portion 18. The tube 15 is pivoted at 20 to the member 10 and is adapted to be held closed by the spring clip 21.

The front 6 contains the opening 19 which is adapted to allow glass slides to be projected. Any suitable prior art type of glass slide holder may be used to hold the slides in position in the projection opening.

Adjacent the top of the front 6 is secured the film container 22 adapted to contain the film 23 which is prevented from escaping therefrom by the pivoted finger or lever 24 which may be pivoted out of the way to allow insertion of said film 23 in said container 22, and then pivoted over the open end of said member 22 to prevent escape of the film 23. The container 22 has an opening in alignment with an opening in the front 6 to allow the film to pass through said aligned openings, between the film gate plates 13 and 14, and then downwardly and forwardly through another opening in the member 6.

Various means may be utilized to gather the film after it passes out of the housing 6. Two such means are shown. The film may be gathered in the cup 25 or may be caused to roll up again by the curved blade spring member 26 which is secured to the lower side of the objective tube 15.

To move the film 23 there is provided the sprocket 27 keyed on the shaft 28, which has the knob 29 for rotating the shaft and sprocket together with the cam 30 having the portion 31 for use in projecting single frame images and the portion 32 for use in projecting double frame images. The said cam portions 31 and 32 have curved faces adapted to engage the curved face on the end of the blade spring 33 which has one end secured at 34 to the casing. The spring and cam act as a stop and an indicating mechanism to successively frame the pictures to be projected.

The said cams 30 are secured to the shaft 35 which fits over and telescopes with the end of the shaft 28. The shaft 35 is provided with the knob 36 for moving the cam 30 so that either the cam face 31 or the cam face 32 will engage the indexing spring 33 so that the projector can be easily and quickly adjusted so as to project single or double frame images as desired. It will be noted that the double framing cam 32 has the two curved projecting end portions 32a which prevent the changing from the single framing cam 31 to the double framing cam 32 when either of said end portions 32a is behind the spring 33, and that if the knob were then pulled out to change the framing from single to double framing, that one of the said end portions 32a would engage the spring 33 and if pulled hard enough might bend or break said spring 33. Accordingly, we have provided the shaft 35 with the circular slots 37 and 38 and the diametrically opposed connecting slots 39. When the cam 30 is turned with the indexing spring, engaging the double framing cam face 32, the key 40 is in the slot 37 and the cam can only be changed from double to single framing when the cam is so turned that the said key 40 may pass through one of the slots 39 into the slot 38, and vice versa.

In this construction it is necessary that the double framing cam be so turned that its ends 32a will not contact the spring 33 before the key 40 will pass through one of the slots 39 into the slot 38 and thereby there is no possibility of any damage being done to the spring 33 by said end portions 32a.

To prevent damage or injury to the film while passing through the film gate between the plates 13 and 14, there is provided an arrangement whereby one of the plates will separate or move away from the other plate before the film starts to advance, and will remain separated during movement of the film, but on the release of the film advancing knob 29, the plate will be resiliently urged toward the other plate and said plates 13 and 14 will retain said film therebetween and prevent any buckling or similar movement of the film.

The arrangement for obtaining this advantage comprises a spring 42 for resiliently urging the plate 13 towards the plate 14 at all times. The plate 13 has arms 43 pivotally connected at 44 with the link members 45 which are pivoted at 46. One link member 45 has a forwardly deflected lower end portion 47. On the shaft 28 is provided the friction clutch which comprises a block 48 having a groove in which the shaft 28 is adapted to fit and on the other side of the shaft 28 is placed the flat flexible member 49 which is secured at its ends to the block 48 by means of the screws 50, and by tightening said screws 50, a desired amount of friction may be obtained between the shaft 28 and block 48. It will be seen that when the knob 29 is turned to rotate the shaft 28 and sprocket 27, to advance the film, that before the film begins to advance the block 48 will engage the deflected end portion 47 which pivots the lever 45 to separate the plate 13 out of engagement with the film. The deflected end portion pivots until it touches the side of the casing, as shown in dotted lines in Fig. 5, which acts as a stop, and the shaft 28 then continues to rotate and to turn the sprocket 27 to advance the film a desired amount, during which rotation the shaft 28 slips in the connection with the block 48 and spring 49, while said block 48 retains said member 47 in pivoted position until on release of the knob 29, the block 48 returns to its normal position allowing the end 47 and lever 45 to do likewise, and thus the plate 13 is resiliently urged towards the film to prevent any moving or buckling of the film.

When a film is inserted in the container 23, it is then threaded through the film gate and past the sprocket 27. It is then necessary to properly frame the first slide or picture so that the others will be automatically aligned with the projection opening by merely rotating the knob 29 to advance the film and the cam 30 and spring 33 will act as an indexing device to stop the film at each successive slide or picture.

To allow framing of the slide or picture as stated above, we have provided the clutch arrangement shown in Figs. 4, 7 and 10. This framing is effected by pushing in the knob 29 which pushes the shaft 28 and by means of the clutch arrangement the picture may be framed without moving the cam indexing mechanism and thereafter each successive picture will be automatically framed by said cam indexing mechanism.

The principle of the clutch arrangement which is shown in Figs. 4 and 10 comprises the provision of a series of friction discs operating on their flat surfaces and each second disc being attached to the driven member while the others are attached to the driving member, each disc being attached to its respective member in such a manner that it is movable axially but not rotatably.

The object of the clutch is to allow independent framing of the picture without moving the the cam. Also the framing can be done in either direction. It will also be noted that if the cam is not completely indexed, that complete release of the clutch allows self indexing of the cam.

The clutch mechanism comprises the sprocket 27 having on one end thereof the slots 51 and 52, the slots 51 being adapted to receive the tongues or keys 68 on the disc 54, and the slots 52 being adapted to receive the tongues or keys 53 on the disc 55.

The shaft 56 having the slots 57 is adapted to fit over in telescoping relation with the shaft 28.

The discs 58 have the tongues 59 adapted to be received in the said slots 57. The disc 60 is secured to the shaft 56 or may be formed integral therewith. The disc 61 of leather or the like is provided to increase friction as is also provided the disc 62 carrying ball bearings. The disc 63 is adapted to fit over the ball bearing disc 62 and be retained in contact therewith by means of the yoke spring 64 which is secured at its opposite end 65 to the casing.

The end 69 of the shaft 56 has an opening to allow the reduced extension 66 on the shaft 28 to slide therethrough until the shoulder 67 engages said end 69 and further movement moves the shaft 56 horizontally when the knob 29 is pushed into the position shown in dotted lines in Fig. 4. This causes horizontal movement also of the disc 60 which also moves the yoke spring 64 and thereby releases pressure on the discs, thereby allowing the sprocket 27 to rotate, to frame the picture to be projected without movement of the cam 30. Then upon release of the knob 29, the yoke spring again forces the discs together into operative association with each other and with the sprocket 27 so that by rotating the knob 29 the sprocket 27 and cam 30 will again be rotated in unison to index each picture projected.

From the foregoing it will be seen that we have provided simple, efficient and economical means for obtaining all of the objects of the invention.

Having described our invention, we claim:

1. In a device of the character described, a film gate, said film gate having a fixed member and a movable member, means for urging said movable member toward said fixed member, means for supporting a film in operative position on a projector and for allowing said film to be fed through said film gate for projection, a source of light and a lens system for the projection of the portion of the film in the film gate, means for advancing said film comprising a shaft having a sprocket thereon, a lever on the movable member of said film gate and projecting therefrom, frictional means on said shaft directly engaging said lever arm on said film gate for automatically opening said film gate upon rotation of said shaft and before advancement of the film and to retain said film gate in open position during advancement of the film and permit closing of said film gate upon release of said shaft.

2. In a device of the character described, a film gate, said film gate having a fixed member and a movable member, means for urging said movable member toward said fixed member, means adapted to support a film in operative relation with a projector, means adapted to advance said film through said film gate, a source of light and lens system adapted to project the portion of the film in said film gate, said means for advancing the film comprising a shaft and sprocket, a lever on one member of said film gate and projecting therefrom, a member on said shaft adapted to be driven frictionally and directly engaging said lever on said film gate to automatically open said film gate upon rotation of said shaft and to retain said film gate in open position during movement of said film and to permit closing of said film gate upon release of said shaft.

3. In a device of the character described, a projector front having a support having an opening therethrough, said member being adapted to receive a slide holder to receive slides to be projected, a plurality of openings adjacent the outer edges of said support, and resilient members secured to the support adjacent their central points and having their end portions extending through said openings in the support and said end portions being adapted to engage the slide carrier to resiliently retain said slide carrier in position in said opening.

4. In a device of the character described, a casing, a source of light and lens system in said casing, a film gate, means for advancing a film through said film gate, indexing means for said film, means for releasing said indexing means to allow framing of said film, said releasing means comprising a shaft, a plurality of plates keyed to said shaft, and a plurality of plates alternately keyed to said film advancing means, and a resilient member secured at one end to said casing and having its other end adjacent said plates for retaining said plates in operative relation with each other and with said film advancing means.

5. A film gate for a projector comprising a pair of transparent plates between which said film is adapted to be advanced, one of said plates being movable relative to the other, means for urging the movable member relative to the other member, a lever for moving one of said plates relative to the other, a shaft for advancing the film and frictional means directly engaging said lever for pivoting said lever to open said film gate before advancement of the film and to retain said film gate open during the advancement of said film and to allow said film gate to close upon release of said lever.

6. A clutch mechanism for allowing framing of a film, comprising a shaft having film advancing means thereon, said film advancing means having diametrically opposed slots in its outer wall, said shaft having longitudinal diametrically opposed slots, one set of plate members keyed in said diametrically opposed slots, and a second set of plates members alternately keyed to said film advancing means, and a resilient member secured at one end to the casing and having its other end adapted to retain said members frictionally in engagement on said shaft, and means allowing said members to be released for independent movement of the film advancing means for framing the film.

WILLIAM F. PECK.
KENNARD W. HARPER.
ALBIN A. GRADISAR.
WILLIAM K. ARMAGOST.